United States Patent
Fujiwara

(10) Patent No.: US 8,333,130 B2
(45) Date of Patent: Dec. 18, 2012

(54) OPERATING PEDAL APPARATUS FOR VEHICLE

(75) Inventor: Noboru Fujiwara, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 985 days.

(21) Appl. No.: 11/703,780

(22) Filed: Feb. 8, 2007

(65) Prior Publication Data

US 2008/0110289 A1    May 15, 2008

(30) Foreign Application Priority Data

Nov. 15, 2006  (JP) .................................. 2006-309418

(51) Int. Cl.
*G05G 1/30*     (2008.04)
(52) U.S. Cl. ............................................ 74/512; 74/560
(58) Field of Classification Search ............ 74/512–514, 74/560–562; 200/61.89, 86.5; 73/815, 841, 73/132, 862.541; 188/158; 303/3, 15, 20, 303/50, 113.4; 340/479, 438; 180/275, 271; 403/383
See application file for complete search history.

(56) References Cited

U.S. PATENT DOCUMENTS

| | | | | |
|---|---|---|---|---|
| 3,766,342 A | * | 10/1973 | Stadelmann | ............ 200/61.89 |
| 4,978,177 A | * | 12/1990 | Ingraham et al. | ......... 200/61.89 |
| 5,217,280 A | | 6/1993 | Nykerk et al. | |
| 5,563,355 A | | 10/1996 | Pluta et al. | |
| 6,505,496 B2 | * | 1/2003 | Kato et al. | ...................... 73/132 |
| 6,655,199 B1 | * | 12/2003 | Smith | ........................ 73/114.01 |
| 2003/0056616 A1 | * | 3/2003 | Matsumoto et al. | ............ 74/512 |

FOREIGN PATENT DOCUMENTS

| | | |
|---|---|---|
| EP | 2 060 454 | 5/2009 |
| JP | 11-230841 | 8/1995 |
| JP | 11255084 A | * 9/1999 |

OTHER PUBLICATIONS

Chinese Office Action dated Mar. 2, 2010.
European Search Report dated Apr. 20, 2010.

* cited by examiner

*Primary Examiner* — Richard W Ridley
*Assistant Examiner* — Daniel Yabut
(74) *Attorney, Agent, or Firm* — Finnegan, Henderson, Farabow, Garrett & Dunner, LLP

(57) ABSTRACT

An operating pedal device for a vehicle includes an operating pedal mounted on a pedal support fixedly secured to a vehicle to be pivotable about an axis of a support shaft and operative to be depressed by a driver; a reactive member, connected to the operating pedal via at least one connecting section which allows relative pivotal movement therebetween about a connecting pin to which an output is transferred at a rate depending on an operational force of the operating pedal and which is applied with a reaction force corresponding to the output; and a load sensor electrically detecting the operational force. A member pivotably connected via the connecting pin defines a sensor mounting hole allowing insertion of the connecting pin and mounting of the load sensor.

6 Claims, 10 Drawing Sheets

OPERATING PEDAL APPARATUS FOR VEHICLE

This application is based on Japanese Patent Application No. 2006-309418.

BACKGROUND OF THE INVENTION

1. Field of the Invention

This invention relates to a operating pedal device for vehicle, and more particularly, to technologies of forming the operating pedal device for vehicle, having the load sensor for electrically detecting an operational force, in a compact structure at low cost.

2. Description of the Related Art

An operating pedal device for vehicle, such as a brake pedal device and an accelerator pedal device had been widely used. It includes (a) an operating pedal mounted on a pedal support fixedly secured to a vehicle to be pivotable about an axis of a support shaft and subjected to a depression operation by a driver; and (b) a reactive member connected to the operating pedal via at least one connecting section, which allows a relative pivotal movement between the operating pedal and the reactive member about a connecting pin, to which an output is transferred at a rate depending on an operational force of the operating pedal and which is applied with a reaction force corresponding to the output. One kind of such operating pedal device for vehicle has been known to have the load sensor that electrically detects the operational force.

With a device disclosed in, for instance, a Patent Publication 1, a push rod protruding from a master cylinder is connected to a connecting pin protruding from a side wall of an operating pedal to be relatively movable in an axial direction, so that a sensor can detect a displacement value of the push rod displaced relative to the connecting pin against the biasing force of a spring. Further, a Patent Publication 2 discloses technology in which a piezoelectric converter element is interposed as the load sensor between a clevis connected relatively pivotable to an operating pedal through a clevis pin, and an operating rod.

Patent Publication 1: U.S. Pat. No. 5,563,355
Patent Publication 2: Japanese Unexamined Patent Application Publication No. 11-230841

With the device disclosed in Patent Publication 1, however, since the push rod needs to have a slotted hole for connection with relative movement in an axial direction, a regularly used push rod cannot be used intact. Further, since the push rod is caused to pivot relative to the connecting pin with the depression operation of the operating pedal, the spring biasing the push rod, and the sensor detecting the displacement value, need to be pivotably mounted with respect to the connecting pin, resulting in a complicated structure. Moreover, since the push rod, the spring and the sensor are located in side areas of the operating pedal, a robust structure needs to be provided especially for the brake pedal or the like to ensure a stabilized operative condition. This causes a device to be structured on a major scale as a whole with an increase in cost.

With the device of Patent Publication 2, further, the piezoelectric converter element needs to be disposed between the clevis and the operating rod, and can hardly employs a regularly used operating rod and clevis, causing an increase in cost of the device.

The present invention has been completed on the background with the above issues in mind and has an object to provide an operating pedal device for vehicle having the load sensor for electrically detecting an operational force, which enables a rod and a clevis employed in the conventional pedal, to be used intact while enabling the provision of a compact structure at low cost.

SUMMARY OF THE INVENTION

For achieving the above object, the first invention is featured by that (a) an operating pedal mounted on a pedal support fixedly secured to a vehicle to be pivotable within a limited angle about an axis of a support shaft and operative to be depressed by a driver; (b) a reactive member connected to the operating pedal via at least one connecting section which allows relative pivotal movement between the operating pedal and the reactive member about a connecting pin to which an output is transferred at a rate depending on an operational force of the operating pedal and which is applied with a reaction force corresponding to the output; and (c) a load sensor electrically detecting the operational force; (d) wherein a member pivotably connected via the connecting pin is formed with a sensor mounting hole allowing insertion of the connecting pin and being greater than the connecting pin at a connecting position with the connecting pin, to allow the load sensor to be mounted between the sensor mounting hole and the connecting pin.

The second invention is featured by that, in the operating pedal device for vehicle of the first invention, (a) the connecting pin is a clevis pin provided in the connecting section which is parallel to the connecting pin and through which the reactive member and a pedal side member are connected; (b) the pedal side member is formed with the sensor mounting hole to allow the load sensor to be mounted in a gap between an inner periphery of the sensor mounting hole and the clevis pin; (c) the clevis pin has both ends retained by a U-shaped clevis unitarily fixed to the reactive member; and (d) a part of the pedal side member enters into a hollow portion of the clevis from an open end thereof.

The third invention is featured by that, in the operating pedal device for vehicle of the second invention 2, the pedal side member is the operating pedal, one end of which is supported by the support shaft, other end of which has a depression portion, and an intermediate portion of which is connected to the connecting pin. The fourth invention is featured by that, in the operating pedal device for vehicle of the second invention, (a) it further comprises an intermediate lever pivotably mounted on the pedal support and connected to the operating pedal via a connecting linkage, (b) the pedal side member being the intermediate lever.

The fifth invention is featured by that, in the operating pedal device for vehicle of the first invention, the load sensor includes a detecting member having at least a portion formed in a circular arc-shape configuration and applied with load depending on the operational force, for detecting a strain occurring on the detecting member depending on the operational force.

The sixth invention is featured by that, in the operating pedal device for vehicle of the fifth inventions, the load sensor includes (a) the detecting member formed in a cylindrical shape; (b) an annular first mounting member provided on an outer circumferential periphery of the detecting member, unitarily holding one axial end portion of the connecting member, and being unitarily mounted in the sensor mounting hole; (c) a second mounting member provided on an inner circumferential periphery of the detecting member, unitarily holding other axial end portion of the detecting member, and having an insertion bore through which the connecting pin is inserted; and (d) a strain detecting element fixed to the detecting member; (e) wherein the first mounting member and second mounting member are displaced relative to each other depending on the operational force to allow the strain detecting element to detect a shear strain occurring in the detecting member.

The seventh invention is featured by that, in the operating pedal device for vehicle of the fifth inventions, the load sensor includes (a) the detecting member formed in a cylindrical configuration; (b) an annular mounting member provided on an outer circumferential periphery of the detecting member, unitarily holding a portion of the detecting member at an area around a center line thereof, and being unitarily mounted in the sensor mounting hole; and (c) a strain detecting element fixedly secured to the detecting member; (d) wherein the connecting pin inserted through a cylindrical interior of the detecting member and the annular mounting member are relatively displaced depending on the operational force, to allow the strain detecting element to detect a tensile strain occurring in the detecting member.

The eighth invention is featured by that, in the fourth invention, the intermediate lever is pivoted at one end thereof by the pedal support via a pivot portion parallel to the support shaft, connected at other end thereof to the reactive member via the connecting portion, and connected at an intermediate portion thereof to the operating pedal via the connecting linkage.

The ninth invention is featured by that, in the sixth invention, the load sensor has a ring configuration or an arch configuration as a whole, and is disposed to receive a force generating a shear strain in a diameter or radius direction thereof.

With such operating pedal device for vehicle, the sensor mounting hole is formed in the member pivotably connected via the connecting pin, at a given connecting section through which the operational force applied to the operating pedal is transferred to the reactive member, to allow the load sensor to be mounted between the sensor mounting hole and the connecting pin. This allows the device to have a simple and compact structure as a whole without causing any fear of torsion of the load sensor or the like to occur. Further, it becomes possible to employ the same peripheral component parts, such as a rod and a clevis or the like, as those of the conventional pedal device, enabling the whole apparatus to be provided at low cost.

With the second invention, the load sensor is provided in the connecting section through which the reactive member and the pedal side member is connected to each other, to detect the output transferred to the reactive member as the operational force. Thus, in a case where, for instance, a hydraulic brake or the like is mechanically actuated via the reactive member, a brake force or the like can be detected by the load sensor at high precision. Moreover, the clevis retains the both ends of the clevis pin inserted through the load sensor. Therefore, the load sensor on which no pivotal momentum, such as torsion or the like acts, can detect the operational force at high precision. In addition, even if the pedal side member and the reactive member undergo relative displacement in an axial direction of the clevis pin, the load sensor is ensured to have favorable detecting precision.

The load sensor of the fifth invention includes the detecting member having at least one area formed in the circular-arc configuration and applied with load thereto. This allows the circular-arc configuration to have an angle set in accordance with a relatively pivotable angular range of the connecting section resulting from the depression operation of the operating pedal. Thus, the operational force can be detected at high precision with no need arising for executing a correcting operation or the like, regardless of the relative pivotal movement encountered with the connecting section. In addition, the load sensor has no need to be pivoted even upon variations of a position at which load resulting from the relative pivotal movement acts and in a direction of load being applied. Thus, the device can be formed in a compact structure at low cost. The sixth and seventh inventions can enjoy the above advantages with the strain detecting element having a size and placement position set depending on the relatively pivotable angular range of the connecting section.

The operating pedal device for vehicle of the present invention may preferably be applied not only to a brake pedal device for a regularly used brake but also to operating pedal devices used for an accelerator or a parking brake. While the reactive member may be formed of, for instance, an operating rod of a brake booster or a push rod of a brake master cylinder in a way to mechanically actuate a wheel brake or the like, it may also be applicable to an electric type (by-wire type) in which a wheel brake or a drive unit is electrically controlled depending on an operational force detected with the load sensor. In such application, a stroke simulator or a reacting mechanism or the like may be coupled to the reactive member to apply a given reaction force thereto.

As described in the third and fourth inventions, the connecting section on which the load sensor is provided may preferably be a connecting section through which an operating pedal and a reactive member are connected, or a connecting section through which an intermediate lever and a reactive member are connected. However, the load sensor may also be possibly provided in other connecting sections such as a connecting section between an operating pedal and a connecting linkage, a connecting section between an intermediate lever and a connecting linkage or a connecting section in which an intermediate lever is pivotably supported with a pedal support.

The load sensor of the fifth invention includes the detecting member having the area of the circular-arc configuration and load being applied thereto. Here, noted is that an expression of "area to which load is applied" refers to an area that is subjected to deformation when applied with load, and does not necessarily includes an area to which load is actually applied. Such an area may include a state wherein, for instance, applying a tensile load or a compressive load to both ends of the circular arc of the circular arc-shaped detecting member causes a circular arc-shaped portion to undergo stretching deformation or bending deformation. Also, in a precise sense, the circular arc-shaped detecting member has the form of a solid configuration made of a cylindrical body that is partially cut out.

The detecting member having the cylindrical configuration like, for instance, in the sixth and seventh invention, does not necessarily need to have the cylindrical configuration in implementing the fifth invention. In this case, the detecting member may be suffice to have an angular range to be deformed depending on the operational force, is formed in a circular arc shape with a center on a relatively rotating center point of the connecting section, regardless of the relative pivotal movement of the connecting section resulting from the depression operation of the operating pedal. Moreover, the present invention may be possible to be implemented in various modes wherein the detecting member has a drum-shape in cross section and includes a pair of circular-arc shaped sections and a linear section for connecting both ends of the circular-arc shaped sections to each other. In carrying out the first to fourth inventions, the detecting member may be formed in a linear shape, a curved shape, a polygonal shape or a shape in combination of these shapes.

In a case where the detecting member is not formed in the circular-arc configuration, the load sensor may be suffice to be pivotably supported with a bearing depending on needs, to allow the detecting member to pivot depending on variation of the acting position of load or that in a direction in which load is applied both resulting from the relative pivotal movement of the connecting section. In addition, even in another case where the detecting member takes a circular-arc shape or a cylindrical shape, a bearing may be possibly mounted in a relatively pivoting portion of the connecting section.

Like the sixth and seventh inventions, the load sensor may include the strain detecting element and detects a strain caused in the detecting member subjected to elastic deformation for conversion it to load, that is, an operational force. Although examples of the strain detecting elements may be possible to include strain resistance elements such as a semiconductor strain gauge of a thin film type or a thick film type and a regularly used strain gauge, a piezoelectric element or a piezoelectric converter element or the like may also be possibly used. With the present invention, since the connecting section is relatively pivoted with the depression operation of the operating pedal, the strain detecting element may be preferably set in a size and placement position so as to obtain substantially constant detecting performance over the relevant angular range.

DETAILED DESCRIPTION OF THE PREFERRED EMBODIMENTS

Now, various embodiments of the present invention will be described below with reference to the accompanying drawings.

Figure 1:
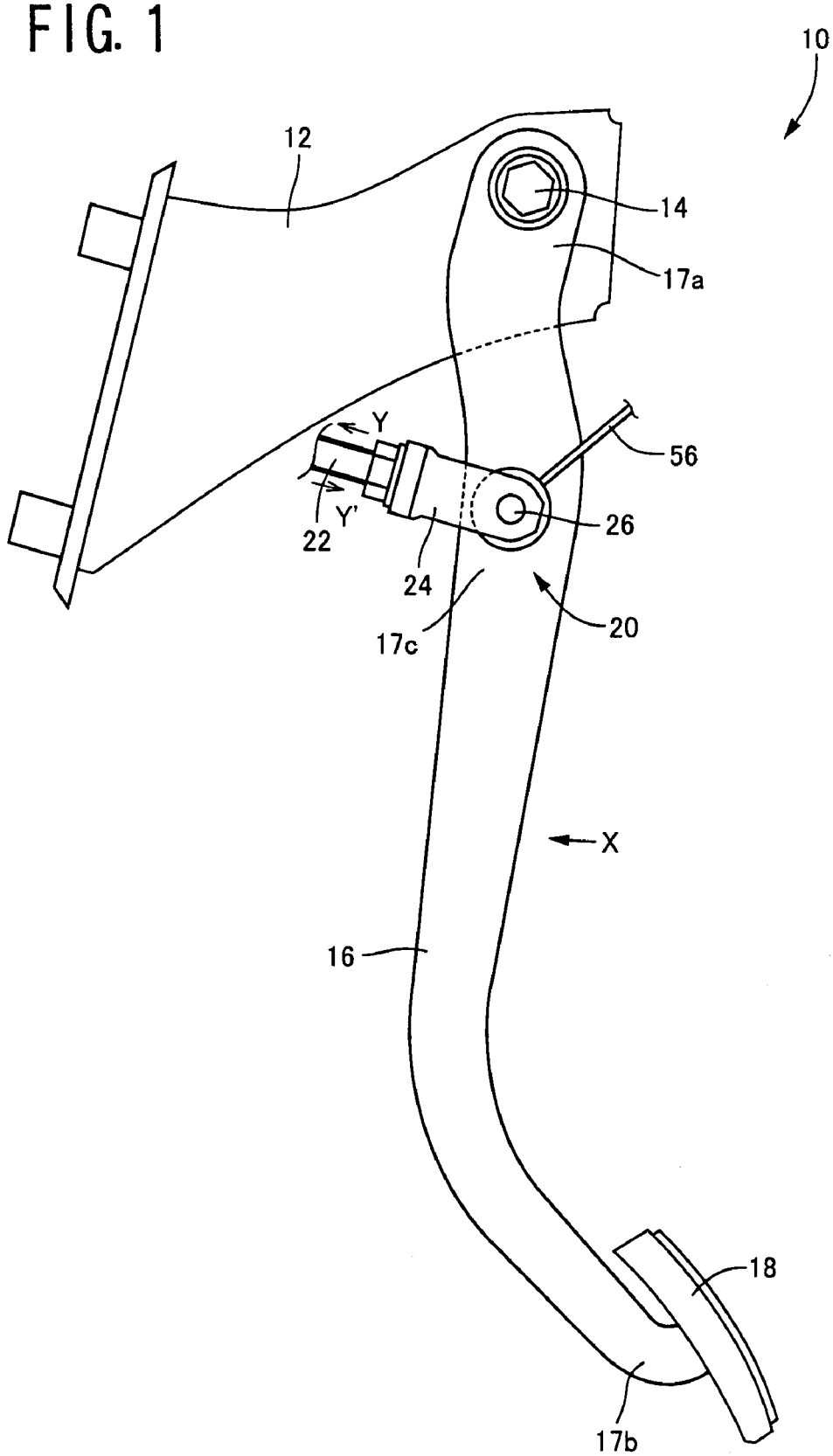
FIG. 1 is a front view showing one example of an operating pedal device for vehicle for a service brake to which the present invention is applied.

FIG. 1 is a front view showing an operating pedal device 10 for a service vehicle brake of one embodiment according to the present invention. A pedal support 12 is fixedly mounted on a vehicle in a unitary fashion, and an operating pedal 16 is mounted at an upper portion 17a thereof on a substantially horizontal support shaft 14 to be pivotable about an axis center thereof. The operating pedal 16 is depressed by a driver upon a braking request has a lower end 17b provided with a pedal pad 18 and an intermediate portion 17c to which an operating rod 22 of a brake booster is connected via a connecting section 20. Also, in the operating pedal device taking the form of a by-wire system with which a wheel brake is electrically controlled, the operating pedal 16 is connected to a reaction member, on which a given reaction force acts due to a reacting mechanism or the like, in place of the operating rod 22.

Figure 2A:
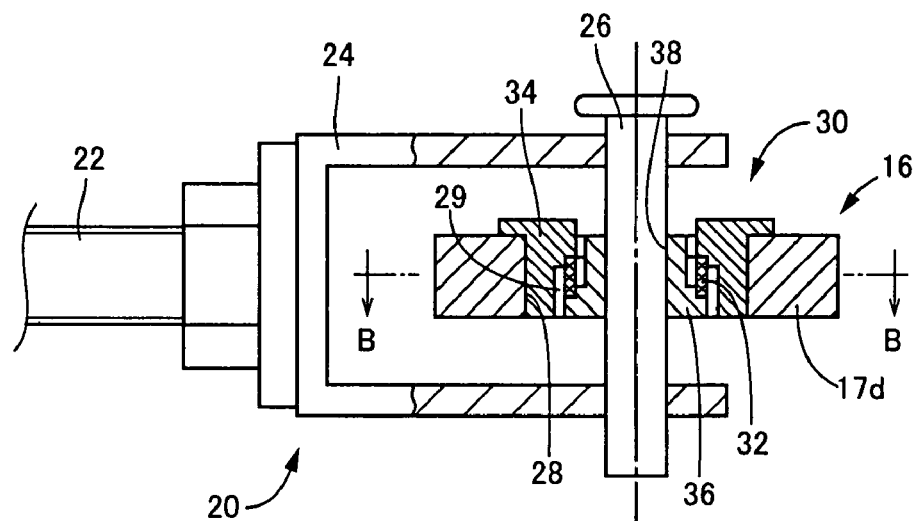
FIG. 2A is a cross sectional view showing a connecting section between an operating pedal and an operating rod.
Figure 2B:
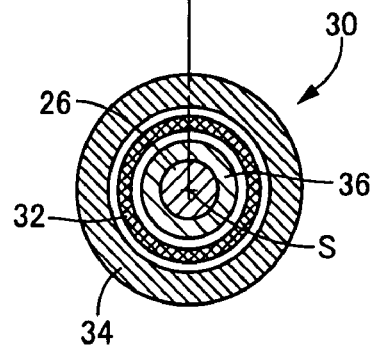
FIG. 2B is a cross sectional view taken on line B-B of FIG. 2A, of the embodiment shown in FIG. 1.

The connecting section 20 comprises a U-shaped clevis 24, unitarily coupled to an end of the operating rod 22 by means of a screw coupling or the like, and a clevis pin 26 mounted on the operating pedal 16 in parallel to the support shaft 14. Thus, the operating rod 22 and the operating pedal 16 are connected to each other for relative pivotal movement about an axis center of the clevis pin 26. FIG. 2A is a cross sectional view showing the connecting section 20 and FIG. 2B is a cross sectional view taken on line B-B of FIG. 2A. The clevis pin 26 has both ends protruding from both sides of the operating pedal 16 and is retained by the U-shaped clevis 24 in non-drop-off capability by means of a snap ring or the like. A portion 17d of the operating pedal 16 enters into a hollow portion 25a of the clevis 24 from an open end thereof. The operating rod 22 corresponds to a claimed reactive member and is applied with an output Y depending on an operational force X of the operating pedal 16 and a reaction force Y' equivalent to such an output resulting from an action of the brake booster. Moreover, the clevis pin 26 corresponds to a claimed connecting pin and the operating pedal 16 corresponds to a claimed pedal side member.

As will be apparent from FIG. 2, the operating pedal 16 has a sensor mounting hole 28 formed in a larger diameter than that of the clevis pin 26 at a connecting position with the clevis pin 26, into which the clevis pin 26 is inserted. An annular space is defined between the sensor mounting hole 28 (more correctly, an inner periphery thereof) and the clevis pin 26 to accommodate therein a load sensor 30. The load sensor 30 has a cylindrical detecting member 32 for detecting load applied thereto in a radial direction, and includes a first annular mounting member 34 placed on an outer peripheral side of the detecting member 32 and a second annular mounting member 36 placed on an inner peripheral side of the detecting member 32.

The first annular mounting member 34 is unitarily assembled to the sensor mounting hole 28 in a predetermined posture (phase) by press fitting or by means of a bolt, a leaf spring or the like and unitarily holds one axial end portion (at an upper distal end in FIG. 2A) 33a of the detecting member 32 by means of welding or the like. In addition, the second mounting member 36 unitarily holds the other axial end portion (at a lower distal end in FIG. 2A) 33b of the detecting member 32 by means of welding or the like and has an axis center portion formed with an insertion bore 38 through which the clevis pin 26 is inserted. The clevis pin 26 is pivotable relative to the insertion bore 38 and the clevis 24. Among these component parts, those encountered with less frictions pivot relative to each other with the pedal operation of the operating pedal 16, and bearings or the like may be intervened depending on needs for reductions in friction.

Thus, the first mounting member 34 and the second mounting member 36 are joined to each other via the detecting member 32. With the detecting member 32 applied with load, which is nearly zero, from an outside in a radial direction, that is, in a direction perpendicular to the shaft axis, the members 32, 34, 36 remain substantially concentric to the shaft axis S of the clevis pin 26 as shown in FIG. 2. The shaft axis S substantially coincides with the shaft axis of the second mounting member 36.

Figure 3A:
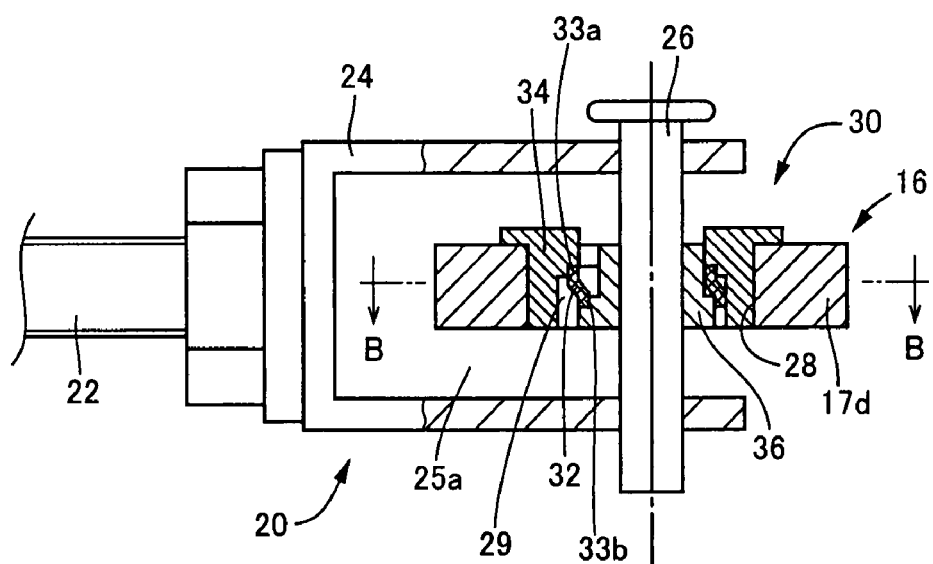
FIG. 3 is a cross sectional view showing a condition under which the operating pedal is depressed from a state shown in FIG. 2 to cause a detecting member to encounter shear deformation due to a reaction force of the operating rod.

In contrast, with the first mounting member 34 and the second mounting member 36 applied with load in a radial direction due to a reaction force of the operating rod 22 by the pedal operation of the operating pedal 16, the detecting member 32 undergoes shear deformation as shown in FIG. 3. When this takes place, the first mounting member 34, associated with the operating pedal 16, is displaced leftward relative to the second mounting member 36, as viewed in FIG. 3, to be close to the operating rod 22 in a relative fashion. An annular space is provided between the first mounting member 34 and the second mounting member 36 to allow the both members to be displaced relative to each other in a radial direction and the detecting member 32 to bear shear deformation. In addition, the detecting member 32 is made of metallic material, such as stainless steel of a ferrite family, being available to bear elastic deformation in response to load acting in a radial direction. Thus, with the operating pedal 16 depressed in operation, the detecting member 32 encounters shear deformation in response to such an operational force.

Figure 3B:
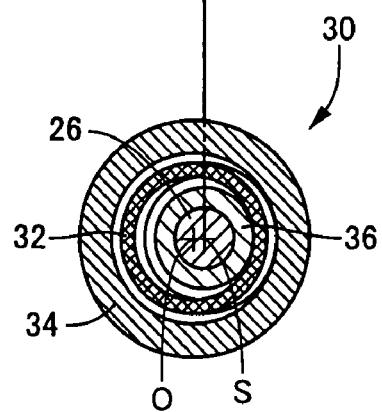

A center point O in FIG. 3B represents a center position of the first mounting member 34, that is, the sensor mounting hole 28. Moreover, although an actual displacement amount of the detecting member 32 is extremely small with almost no adverse affect on a pedal depression stroke of the operating pedal 16, the relevant drawing exaggeratedly shows the displacement value in an enlarged scale for an ease of understanding. This similarly applies to the other drawings.

Figure 4A:
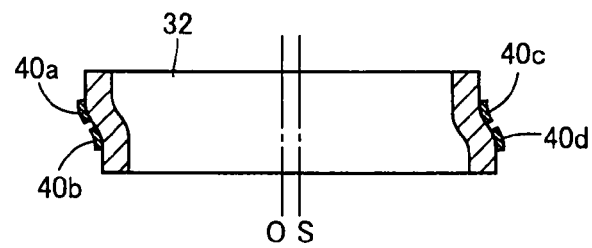
FIG. 4A is a cross sectional view showing the detecting member of FIG. 3A in a large scale.
Figure 4B:
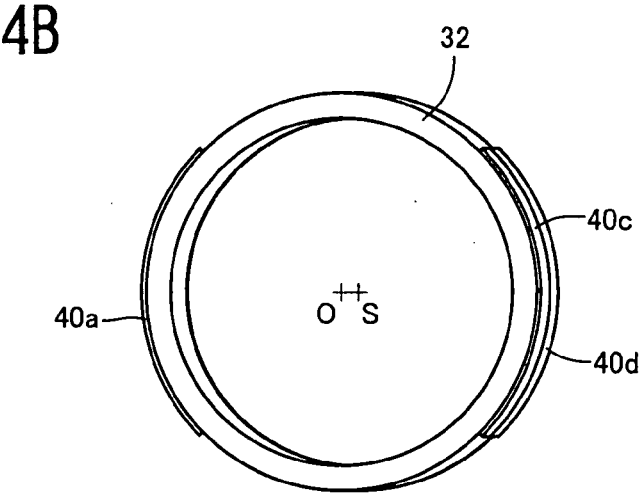
FIG. 4B is a plan view of the detecting member as viewed from the above in FIG. 4A.
Figure 4C:
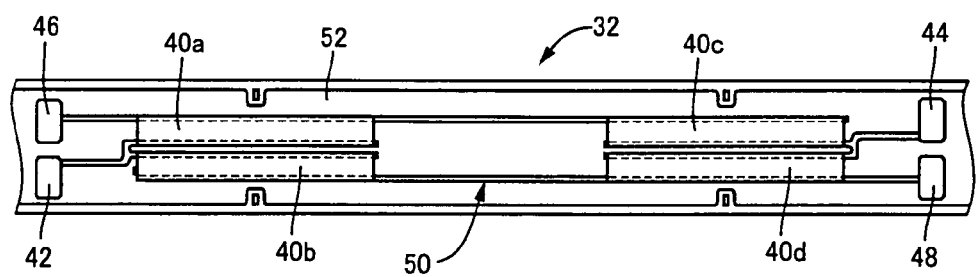
FIG. 4C is a development view of the detecting member, explaining the strain resistance element provided on an outer peripheral surface thereof.

For detecting shear strain of the detecting member 32, the detecting member 32 has an outer periphery provided with four strain resistance elements 40a to 40d as claimed strain detecting elements as shown in FIG. 4. For the strain resistance elements 40a to 40d, regularly used strain gauges such as semiconductor strain gauges of thin film types or thick film types may be preferably employed. FIG. 4A is a view corresponding to FIG. 3A and represents a state where the detecting member 32 undergoes shear deformation; FIG. 4B is a plan view of the detecting member as viewed from the above in FIG. 4A; and FIG. 4C is a development view of the outer periphery of the detecting member 32. The four strain resistance elements 40a to 40d are located on two symmetric positions, sandwiching the shaft axis O (S) at which the detecting member 32 is subjected to shear deformation due to an externally applied load, such that the strain resistance elements are separately disposed one by one in areas that undergo tensile deformation and compression deformation resulting from respective shear deformations caused in an axial direction.

Figure 5:
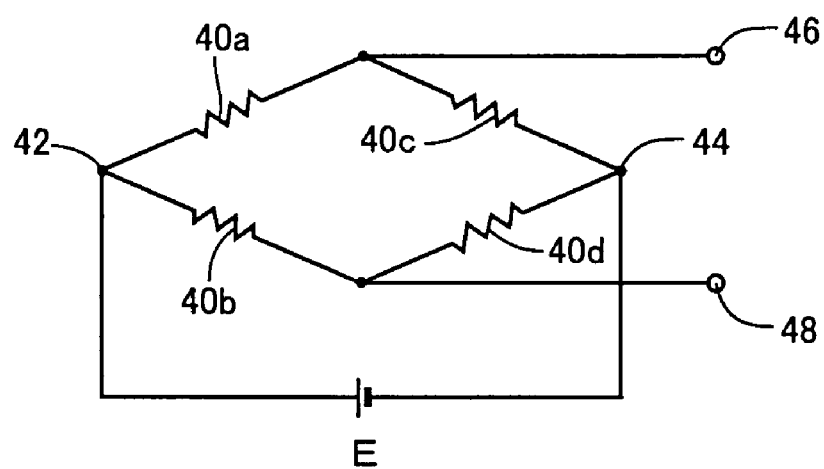
FIG. 5 is a circuit diagram showing a bridge circuit formed with strain resistance elements, shown in FIG. 4C, which are connected in conductive circuit patterns.

Connecting the strain resistance elements in a conductive circuit pattern 50 (see FIG. 4C) forms a bridge circuit as shown in FIG. 5. The conductive circuit pattern 50 has a power supply electrode 42 and a GND (ground) electrode 44 between which a power supply E is connected to allow a pair two output electrodes 46, 48 to output an electric signal depending on a strain. In order to connect the power supply E to the power supply electrode 42 or extract the electrical signal from the output electrodes 46, 48, a wire harness 56 (see FIG. 1), connected to those electrodes, extends from the load sensor 30 and is connected to a control circuit section of a vehicle. Also, the load sensor 30 may be internally provided with the control circuit section. Moreover, while the present embodiment employs a full-bridge circuit, a half bridge circuit may be employed in cases where the load sensor employs a detecting member formed in, for instance, a circular arc shape only in an area susceptible to load depending on an actuating force of the operating pedal 16.

Meanwhile, as the operating pedal 16 is pivoted the support shaft 14 with the depression operation thereof, both the operating rod 22 and the operating pedal 16 are pivoted relative to each other about the axis of the clevis pin 26. This results in variation in an acting position of load applied to the detecting member 32, that is, a deforming direction. In order to obtain a substantially fixed detecting performance regardless of the variation in the acting position of load, sizes and placement positions of the strain resistance elements 40a to 40d are set, and the detecting member 32 has a length in dimension that covers an angular range in the order of, for instance, 90° around the detecting member 32 in a circumferential direction thereof. In addition, the detecting member 32 has an outer circumferential periphery preliminarily provided with an insulating film 52 (see FIG. 4C) such as glass paste or the like on which the conductive circuit pattern 50 is formed with conductive material such as silver or the like. Moreover, the strain resistance elements 40a to 40d are integrally formed by firing and partially brought into contact with the conductive circuit pattern 50.

With such a vehicle operating pedal device 10, the operating pedal 16 connected to the operating rod 22 relatively pivotable via the clevis pin 26 is formed with the sensor mounting hole 28, at the connecting section 20 operative to transfer the actuating force applied to the operating pedal 16 to the operating rod 22. In addition, the cylindrical load sensor 30 is disposed in the annular space formed between the sensor mounting hole 28 and the clevis pin 26. Thus, there is no fear for the load sensor 30 of the occurrence of torsion or the like, and the operating pedal device 10 can be formed in a simple and compact structure as a whole with no adverse affect on a mounting condition on the conventional pedal device.

Further, the operating pedal device 10 can employ the same peripheral component parts, such as the operating rod 22 and the clevis pin 24 or the like, as those of the conventional pedal device, making it possible to provide a structure at low cost.

With the present embodiment, furthermore, the load sensor 30 is mounted in the connecting section 20 between the operating rod 22 and the operating pedal 16 for detecting an output, delivered to the operating rod 22, as an operating force. Therefore, a braking force, appearing in accordance with the output of the operating rod 22, can be detected with high precision.

Figure 6:
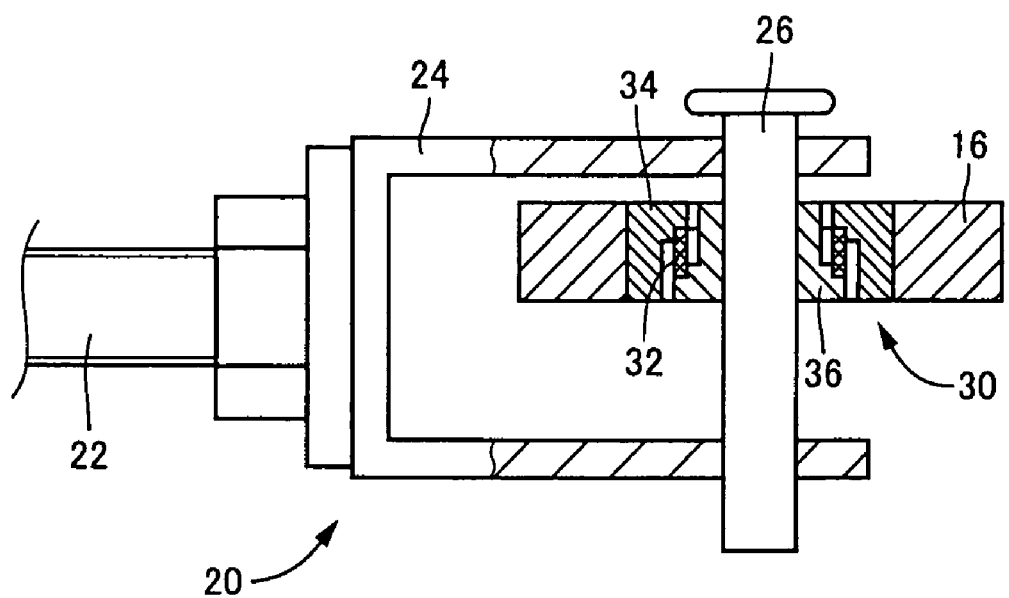
FIG. 6 is a cross sectional view showing a state in which the operating pedal is subjected to relative displacement in an axial direction of a clevis pin in FIG. 2A.

Moreover, since the both ends of the clevis pin 26 inserted through the load sensor 30 are retained by the clevis 24, the operational force can be detected with high precision without causing the load sensor 30 to suffer from any rotational momentum such as torsion or the like. In addition, even if, for instance, the operating pedal 16 is displaced relative to the clevis pin 26 in an axial direction thereof as shown in FIG. 6, the detecting precision of the load sensor 30 is favorably maintained, while permitting the operational force to be transferred to the operating rod 22 without causing any loss.

With the present embodiment, further, the strain resistance elements 40a to 40d are provided on the cylindrical detecting member 32 along the circumferential direction thereof in a predetermined angular range (of approximately 90°), on consideration of relative pivotal movement of the connecting section 20 with the depression operation of the operating pedal 16. Therefore, substantially fixed detecting performance can be obtained regardless of variation in the relative pivotal movement, that is, the acting position at which load is applied to the detecting member 32, enabling the operational force to be detected with high precision with no need to execute correcting operations. In addition, the load sensor 30 including the detecting member 32, has no need to be pivoted relative to the operating pedal 16 even upon variation in the acting position of load accompanied by relative pivotal movement, making it possible to form the operating pedal device 10 in a compact structure at low cost.

Next, another embodiment of the present invention is described. Also, component parts substantially common to those of the embodiment described above bear like reference numerals in the present embodiment and detailed description of the same is herein omitted.

Figure 7A:
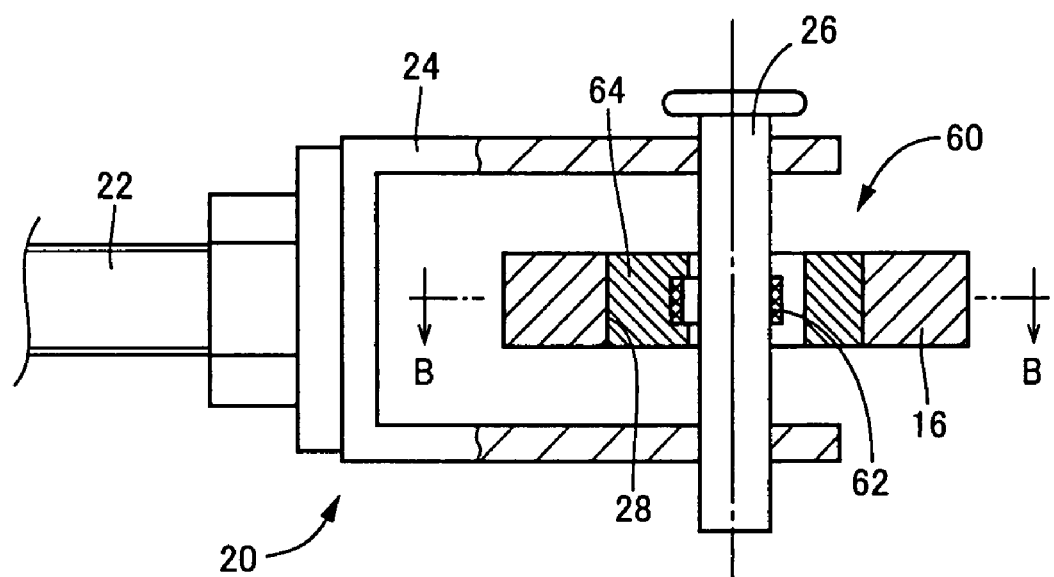
FIG. 7 is a view for illustrating another embodiment according to the present invention and corresponds to FIG. 2.
Figure 7B:
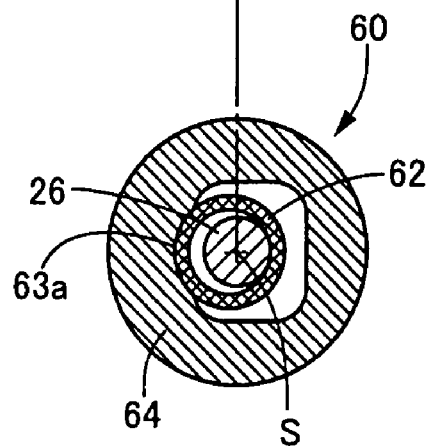

The present embodiment, shown in FIG. 7, represents a case wherein the load sensor 60 is employed in place of the above load sensor 30. The load sensor 60 includes a cylindrical detecting member 62 to detect load applied thereto in a radial direction. An annular mounting member 64 is provided on an outer circumferential periphery of the detecting member 62. The annular mounting member 64 is unitarily assembled to the sensor mounting hole 28 in a fixed posture (phase) by press fitting, a bolt, a leaf spring or the like, and integrally connected to the detecting member 62 in a partial area (a leftward sidewall shown in FIGS. 7A, 7B) 63a thereof around a centerline by welding for unitary supporting. In addition, the clevis pin 26 is inserted through a cylindrical interior of the detecting member 62 so as to intervene between the clevis pin 26 and the operating pedal 16.

With such a load sensor 60, when an external load remains to be nearly zero, the annular mounting member 64 is kept in a substantially concentric relation to the axis S of the clevis pin 26 as shown in FIG. 7. In this state, the detecting member 62 remains in a condition decentered from the axis S of the clevis pin 26 in a way to be nearly held in contact with the clevis pin 26 at an area opposite to the area to which the annular mounting member 64 is fixedly secured, that is, an inner peripheral wall of the detecting member 62 on a rightward sidewall portion thereof as viewed in FIGS. 7A, 7B. This is due to the fact that the operating rod 22 is biased rightward in FIG. 7A by the action of a return spring or the like, which is not shown, and the operating pedal 16 is positioned to and restricted in an initial position in abutting contact with a stopper, which is not shown, under which the detecting member 62 takes a nearly roundness cylindrical configuration.

Figure 8A:
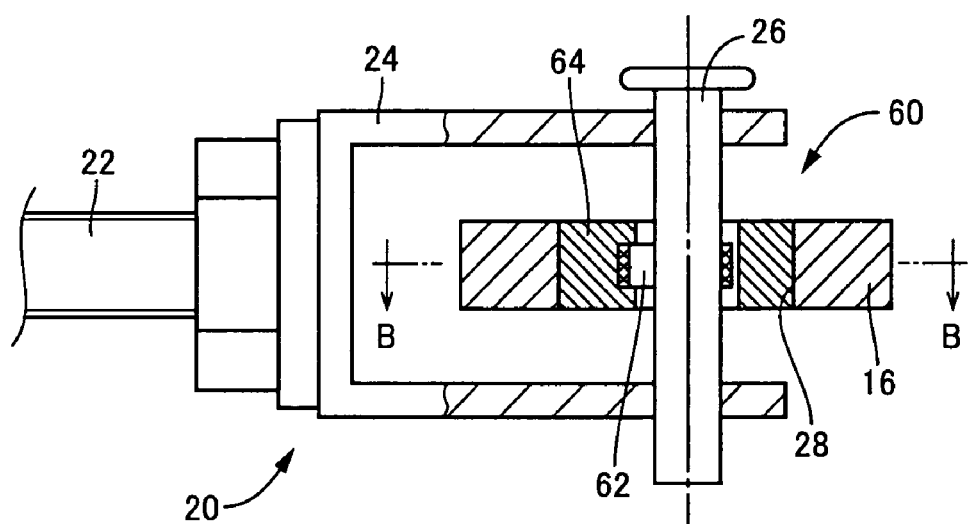
FIG. 8 is a cross sectional view showing a state wherein the operating pedal is depressed from the state shown in FIG. 7 to cause the detecting member to encounter tensile deformation in an elliptical shape due to a reaction force of the operating rod.
Figure 8B:
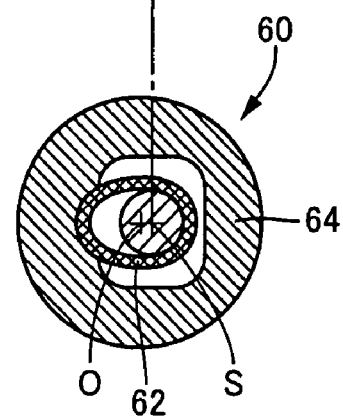

Meanwhile, as load is applied to between the annular mounting member 64 and the clevis pin 26 in a radial direction due to a reaction force exerted by the operating rod 22 with the depression operation of the operating pedal 16, the detecting member 62 undergoes tensile deformation in an elliptical shape as shown in FIG. 8 and is displaced leftward as viewed in FIG. 8 to cause the annular mounting member 64 to be close to the clevis pin 26. The annular mounting member 64 has an annular internal space formed in a size determined so as to permit relative displacement with respect to the clevis pin 26 and tensile deformation of the detecting member 62. In addition, the detecting member 62 is made of metallic material such as stainless steel of ferrite family or the like that is elastically deformable upon receipt of load applied in the radial direction. Thus, with the operating pedal 16 depressed in operation, the detecting member 62 undergoes tensile deformation according to the resulting operational force. The center point "O" in FIG. 8B represents a center position of the annular mounting member 64, that is, the sensor mounting hole 28.

In order to detect tensile strain on the detecting member 62, the same strain resistance elements as those of the embodiment described above are fixedly attached as strain detecting elements onto sidewall portions of an outer circumferential periphery of the detecting member 62 at upper and lower positions as viewed in FIG. 8B, that is, areas on which tensile strain occurs. Also in the present embodiment, since an acting position of load applied to the detecting member 62 varies with the depression operation of the operating pedal 16 with the resultant variation in tensile direction, the sizes and placement positions of the strain resistance elements are set so as to obtain substantially constant detecting performance, regardless of the variation in the acting position of the resulting load. Further, the outer circumferential periphery of the detecting member 62 is preliminarily formed with an insulating film such as glass paste or the like in the same way as that of the embodiment mentioned above. A conductive circuit pattern is formed on the insulating film using conductive material such as silver or the like, and the strain resistance elements are unitarily formed by firing so as to be partially brought into contact with the conductive circuit pattern.

Figure 9:
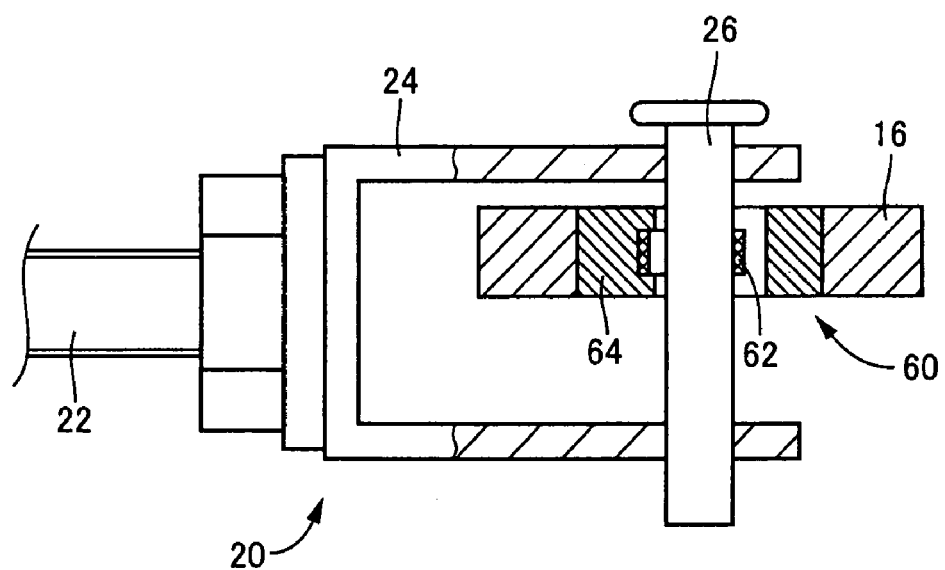
FIG. 9 is a cross sectional view showing a state wherein the operating pedal is subjected to relative displacement in an axial direction of a clevis pin in FIG. 7A.

Also in the present embodiment, since the load sensor 60 is mounted on the connecting section 20, the same advantageous effects as those of the embodiment mentioned above can be obtained including an effect of forming a whole structure in a simplified and compact structure. FIG. 9 is a view, corresponding to FIG. 6, which shows a state where the operating pedal 16 is axially displaced relative to the clevis pin 26. Even in this case, both ends of the clevis pin 26 are retained by the clevis 24, and hence, the load sensor 60 can maintain high detecting precision regardless of such a relative displacement.

Figure 10:
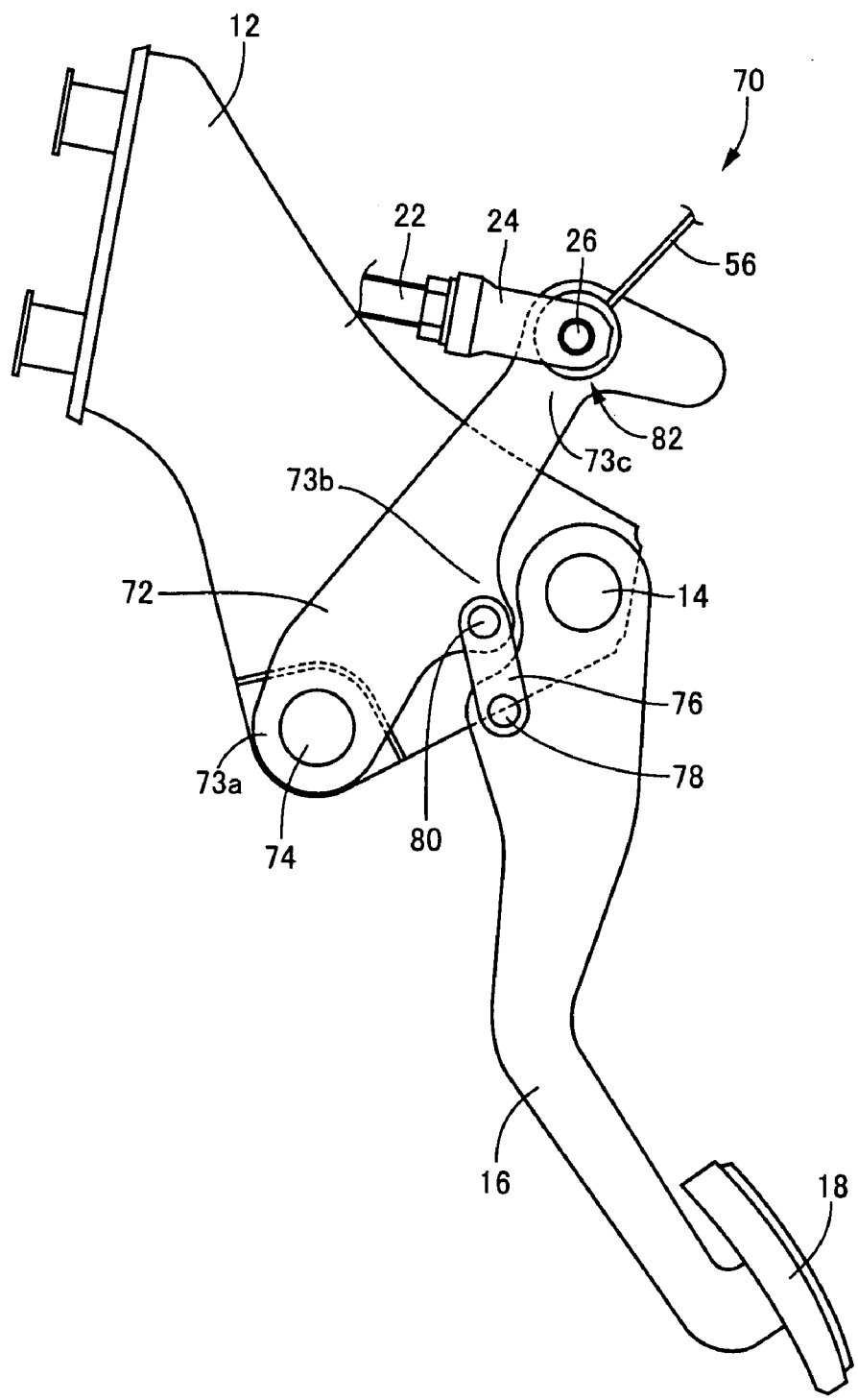
FIG. 10 is a view showing another embodiment according to the present invention and corresponds to FIG. 1.

Further, an operating pedal device 70, shown in FIG. 10, includes an intermediate lever 72 through which an operational force is transferred from the operating pedal 16 to the operating rod 22. The intermediate lever 72 is pivotably mounted at a lower portion 73a thereof on the pedal support 12 by means of a support pin 74 extending parallel to the support shaft 14 and connected at an intermediate portion 73b thereof to the operating pedal 16 via a connecting linkage 76, to be mechanically pivoted about the support pin 74 in conjunction with the depression operation of the operating pedal 16. An upper portion 73c is connected via a connecting section 82 to the connecting rod 22. The connecting linkage 76 has both ends respectively interconnected to the operating pedal 16 and the intermediate lever 72 in relatively pivotable fashion by means of a pair of connecting pins 78, 80 extending parallel to the support shaft 14.

Further, the intermediate lever 72 has a distal end connected by the operating rod 22 by means of the connecting section 82. The connecting section 82 has the same structure as the above connecting section 20, and the intermediate lever 72 is formed with a sensor mounting hole. The load sensor 30 or 60 is assembled to an annular space provided between the sensor mounting hole and the clevis pin 26. Accordingly, the present embodiment also has the same advantageous effects as those of the embodiment set forth above.

Furthermore, the present invention may be applied to the connecting section in which the connecting linkage 76 is connected to the operating pedal 16 and the intermediate lever 72 relatively pivotable by means of the connecting pins 78, 80, and the connecting section in which the intermediate lever 72 is pivotably mounted on the pedal support 12 via the support pin 74. That is, the sensor mounting hole is provided in any one of the component parts of the connecting section between the operating pedal 16 and the connecting linkage 76, the connecting section between the connecting linkage 76 and the intermediate lever 72, or the connecting section between the intermediate lever 72 and the pedal support 12 in the same manner as the connecting section 20 mentioned above to allow the load sensor to be mounted in an annular space formed between the sensor mounting hole and the connecting pins 78, 80 or the support pin 74.

With the above, while the present invention has been described with reference to the embodiments shown in the drawings, the particular embodiments disclosed are meant to be illustrative only, and the present invention may be implemented in various modifications and improvements in the light of knowledge of those skilled in the art.

What is claimed is:

1. An operating pedal device for vehicle, comprising:
   an operating pedal mounted on a pedal support fixedly secured to a vehicle to be pivotable about an axis of a support shaft and operative to be depressed by a driver;
   a reactive member connected to the operating pedal via at least one connecting section which allows relative pivotal movement between the operating pedal and the reactive member about a connecting pin to which an output is transferred at a rate depending on an operational force of the operating pedal and which is applied with a reaction force corresponding to the output;
   a pedal side member connected relatively pivotably via the connecting pin at a connecting position with the connecting pin and forming a sensor mounting hole therein, and
   a load sensor electrically detecting the operational force, which is fixedly attached in the sensor mounting hole and through which the connecting pin is passed to be disposed concentrically with an axis of the sensor mounting hole;
   and the load sensor including
   a detecting member formed in a cylindrical shape;
   an annular first mounting member provided on an outer circumferential periphery of the detecting member, unitarily fixing one axial end portion of the detecting member, and being unitarily mounted in the sensor mounting hole;
   a second mounting member provided on an inner circumferential periphery of the detecting member, unitarily fixing other axial end portion of the detecting member, and having an insertion bore through which the connecting pin is inserted;
   a strain detecting element fixed to the detecting member;
   a first annular space provided successively on the inner circumferential periphery of the first mounting member at one radial side of the detecting member and a second annular space provided successively on the outer continuous circumferential periphery of the second mounting member at other radial side of the detecting member such that the first annular space and the second annular space allow a relative shifting between the first mounting member and the second mounting member in a radial direction of the detecting member; and
   the first mounting member and second mounting member being displaceable relative to each other depending on the operational force, to allow the strain detecting element to detect a shear strain occurring in the detecting member.

2. The operating pedal device for vehicle according to claim 1, wherein the connecting pin is a clevis pin provided in the connecting section which is parallel to the axis of the support shaft and through which the reactive member and a pedal side member are connected;
   the load sensor is mounted in a gap formed between an inner periphery of the sensor mounting hole and the clevis pin;
   the clevis pin has both ends retained by a U-shaped clevis unitarily fixed to the reactive member; and
   a part of the pedal side member enters into a hollow portion of the clevis from an open side thereof.

3. The operating pedal device for vehicle according to claim 2, wherein the pedal side member is the operating pedal, one end of which is supported by the support shaft, another end of which has a depression portion, and an intermediate portion of which is connected to the connecting pin.

4. The operating pedal device for vehicle according to claim 2, further comprising an intermediate lever pivotably mounted on the pedal support and connected to the operating pedal via a connecting linkage, the pedal side member being by the intermediate lever.

5. The operating pedal device for vehicle according to claim 4, wherein the intermediate lever is pivoted at one end thereof by the pedal support via a pivot portion parallel to the support shaft, connected at other end thereof to the reactive member via the connecting portion, and connected at an intermediate portion thereof to the operating pedal via the connecting linkage.

6. The operating pedal device for vehicle according to claim 1, wherein the load sensor has a ring configuration or an arch configuration as a whole, and is disposed to receive a force generating a shear strain in a diameter or radius direction thereof.

* * * * *